(12) United States Patent
Mishra et al.

(10) Patent No.: US 8,482,609 B1
(45) Date of Patent: Jul. 9, 2013

(54) METHODS AND APPARATUS RELATED TO SURVEILLANCE SYSTEM MARKETING, PLANNING AND/OR INTEGRATION

(75) Inventors: Deepam Mishra, East Windsor, NJ (US); Bruce L. Barfield, Marshall, VA (US); Garrick Chin, Princeton Junction, NJ (US)

(73) Assignee: Sightlogix, Inc., Princeton, NJ (US)

( * ) Notice: Subject to any disclaimer, the term of this patent is extended or adjusted under 35 U.S.C. 154(b) by 1899 days.

(21) Appl. No.: 11/603,748

(22) Filed: Nov. 22, 2006

(51) Int. Cl.
*H04N 7/18* (2006.01)
*H04B 7/00* (2006.01)

(52) U.S. Cl.
USPC .......................................... 348/144; 348/143

(58) Field of Classification Search
USPC ........................... 348/143, 144, 145; 356/34.2
See application file for complete search history.

(56) References Cited

U.S. PATENT DOCUMENTS

| | | | |
|---|---|---|---|
| 6,989,745 B1 * | 1/2006 | Milinusic et al. | 340/541 |
| 7,242,295 B1 * | 7/2007 | Milinusic et al. | 340/541 |
| 7,342,489 B1 * | 3/2008 | Milinusic et al. | 340/506 |
| 2003/0085992 A1 * | 5/2003 | Arpa et al. | 348/47 |
| 2008/0284848 A1 * | 11/2008 | Martin | 348/143 |
| 2009/0237508 A1 * | 9/2009 | Arpa et al. | 348/153 |

* cited by examiner

*Primary Examiner* — Moustafa M Meky
(74) *Attorney, Agent, or Firm* — Straub & Pokotylo; Michael P. Straub; Stephen T. Straub

(57) ABSTRACT

Camera based surveillance system planning methods and apparatus are discussed. A surveillance system integration tool, which may be downloaded into a user's computer system, allows for the insertion and orientation of surveillance cameras onto a map, e.g., a downloaded satellite based map. The integration tool presents the user with various surveillance system planning options. A user selects between various available camera types, e.g., visible vs IR spectrum, and between various camera configuration settings, with the user's selections being received and processed by the integration tool. The integration tool allows a user, e.g., a potential customer, to manipulate camera positioning, orientation, and/or settings, thus changing coverage areas for surveillance. The integration tool outputs for display and/or hardcopy a generated output plan including a map with an overlay including at least one inserted camera indication and a corresponding camera surveillance coverage area indication. A corresponding purchase order/quotation is also generated.

46 Claims, 12 Drawing Sheets

700

| GENERATED PURCHASE ORDER FOR SURVEILLANCE KIT | | |
|---|---|---|
| ITEM QUANTITY | ITEM DESCRIPTION | PRICE EACH (US Dollars) |
| 2 | VISIBLE SPECTRUM SMART SURVEILLANCE CAMERA * | 225.00 |
| 1 | IR SPECTRUM SMART SURVEILLANCE CAMERA * | 300.00 |
| 3 | CAMERA MOUNT KIT * | 27.00 |
| 1 | COMMUNICATIONS ROUTER HUB | 125.00 |
| 1 | CENTRAL CONTROLLER MODULE | 250.00 |
| 1 | MONITOR/ALARM STATION | 300.00 |
| | TOTAL | 1506.00 |

\* Note : Item is factory configured to user selected setting

FIGURE 7

METHODS AND APPARATUS RELATED TO
SURVEILLANCE SYSTEM MARKETING,
PLANNING AND/OR INTEGRATION

FIELD OF INVENTION

The present invention relates generally to apparatus and methods for surveillance, and more particularly to apparatus and methods related to surveillance system marketing, planning and/or integration.

BACKGROUND

Camera based surveillance systems are being used more frequently for a variety of applications including public site security, private site security, infrastructure security, traffic management, border monitoring, and crime investigation. For a potential deployment at a site of interest, a potential customer typically needs to evaluate alternatives and construct a plan for surveillance. Constructing a surveillance plan can be a time consuming and complicated process as a user needs to consider: the layout of the site of interest, how many and which type of cameras to use, where to situate cameras, and how to set up and orient the cameras.

In view of the above, it would be beneficial if there was a user friendly automated integration tool for planning a surveillance site. It would be beneficial if such automated tool were integrated to be compatible with available Internet based maps. It would also be beneficial if such an automated integration tool included features allowing a user to quickly construct alternative surveillance plans identifying user inserted camera locations and corresponding surveillance coverage areas. A surveillance system provider which made available such an integration tool to its potential customers could have a competitive advantage in marketing and/or selling its surveillance systems.

SUMMARY

Various embodiments of the present invention are directed to a method of providing surveillance system planning information, the method including: operating a computer system to generate a surveillance layout plan including at least one camera position indicator and a corresponding surveillance coverage area indicator; and operating the computer system to output said generated layout plan. In some embodiments, the method includes downloading a map, e.g., a satellite based map, and/or at least a portion of a surveillance system integration tool, e.g., via the Internet. The downloaded map and the downloaded at least a portion of a surveillance system integration tool are downloaded, in some embodiments, from different Web sites. The method includes inserting one or more cameras, e.g., smart cameras including detection capability, onto a map as part of a map overlay and orienting the inserted cameras. In various embodiments, operating the computer system to generate a layout plan includes receiving at least one of camera type selection information, camera configuration information, and surveillance set-up information.

Various embodiments of the present invention are directed to an apparatus capable of providing surveillance system planning information, the apparatus including: a layout plan generation module for generating a surveillance layout plan including at least one camera position indicator and a corresponding surveillance coverage area indicator; and an output module for outputting said layout plan to one of a communications network, a printer and a display device. A download module included in the apparatus downloads, in some embodiments, at least one of a map and at least portion of a surveillance system integration tool, e.g., via the Internet. An overlay module, included as part of said surveillance tool, overlays, for one or more inserted camera, a camera position indicator and a corresponding surveillance coverage indicator on a map, e.g., on a satellite based map which has been downloaded. Camera location information, camera type information, camera configuration information, and/or surveillance area information relevant to the surveillance plan are received and/or generated and stored in the apparatus' memory. A user of the surveillance system integration tool may insert and/or delete cameras into the plan, vary settings and/or adjust coverage areas, thus facilitating the consideration of multiple alternative deployments of a surveillance system for a site under consideration. In various embodiments, the surveillance system planning tool also generates a purchase order and/or quotation corresponding to the map of the surveillance site including camera overlay information, thus providing a potential customer of a surveillance system with a useful package of information for insertion into a presentation, proposal, or purchase order.

While various embodiments have been discussed in the summary above, it should be appreciated that not necessarily all embodiments include the same features and some of the features described above are not necessary but can be desirable in some embodiments. Numerous additional features, embodiments and benefits of the various embodiments are discussed in the detailed description which follows.

BRIEF DESCRIPTION OF THE FIGURES

FIG. 7 is a drawing of an exemplary generated purchase order corresponding to an exemplary surveillance kit for a new surveillance system represented by FIG. 6.

DETAILED DESCRIPTION

Figure 1:
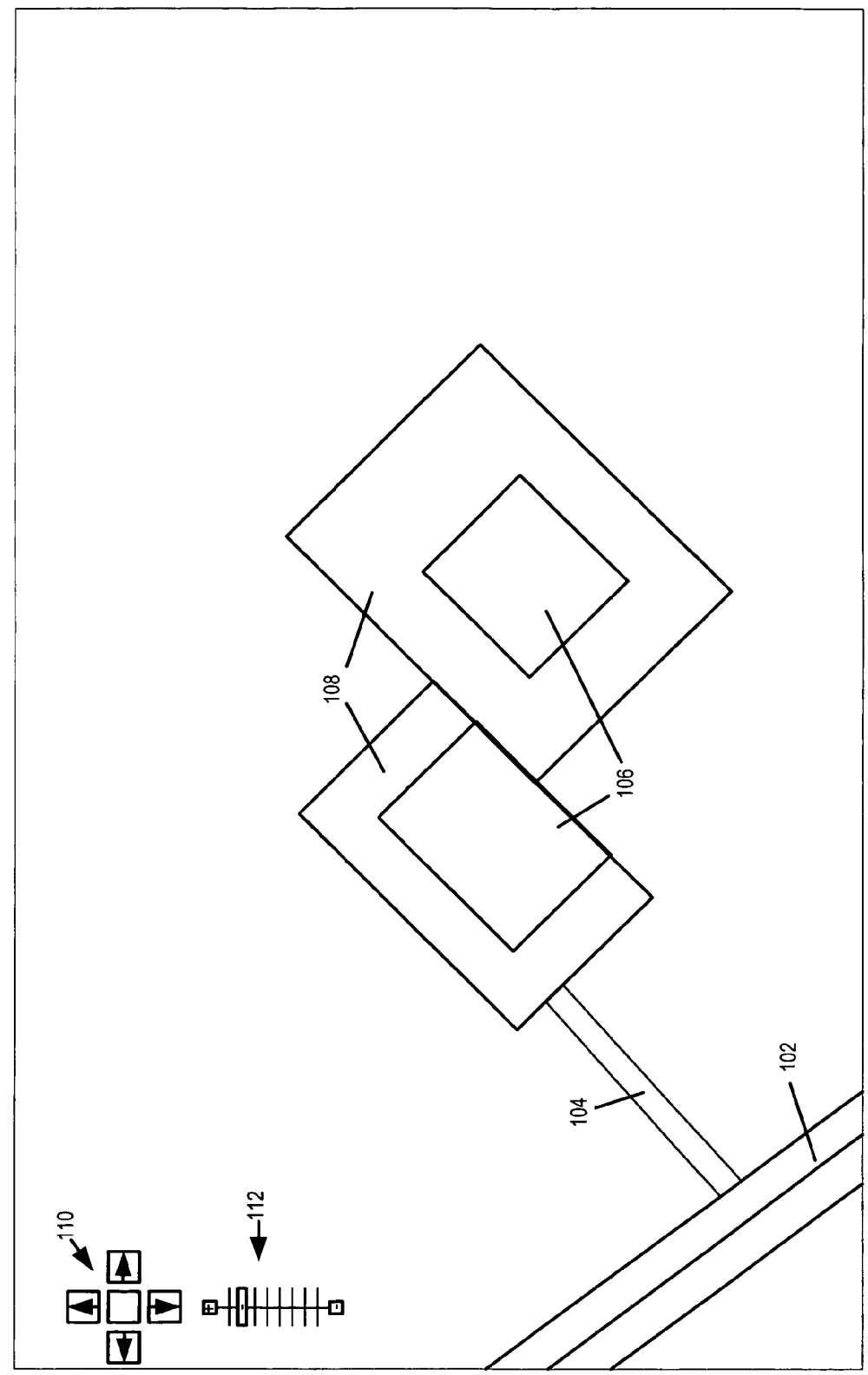
FIG. 1 is a drawing of an exemplary map, e.g., e.g., a satellite map image from an on-line computer mapping service.

FIG. 1 is a drawing 100 of an exemplary map, e.g., e.g., a satellite map image from an on-line computer mapping service. The exemplary map includes a main road 102, an access road 104, several buildings 106, and several parking lots 108. Various controls overlaid on the exemplary map include directional controls 110 and scaling controls 112 for adjusting the map viewing. An individual or entity considering the purchase of a surveillance system may locate a site of interest using the mapping service.

Figure 2:
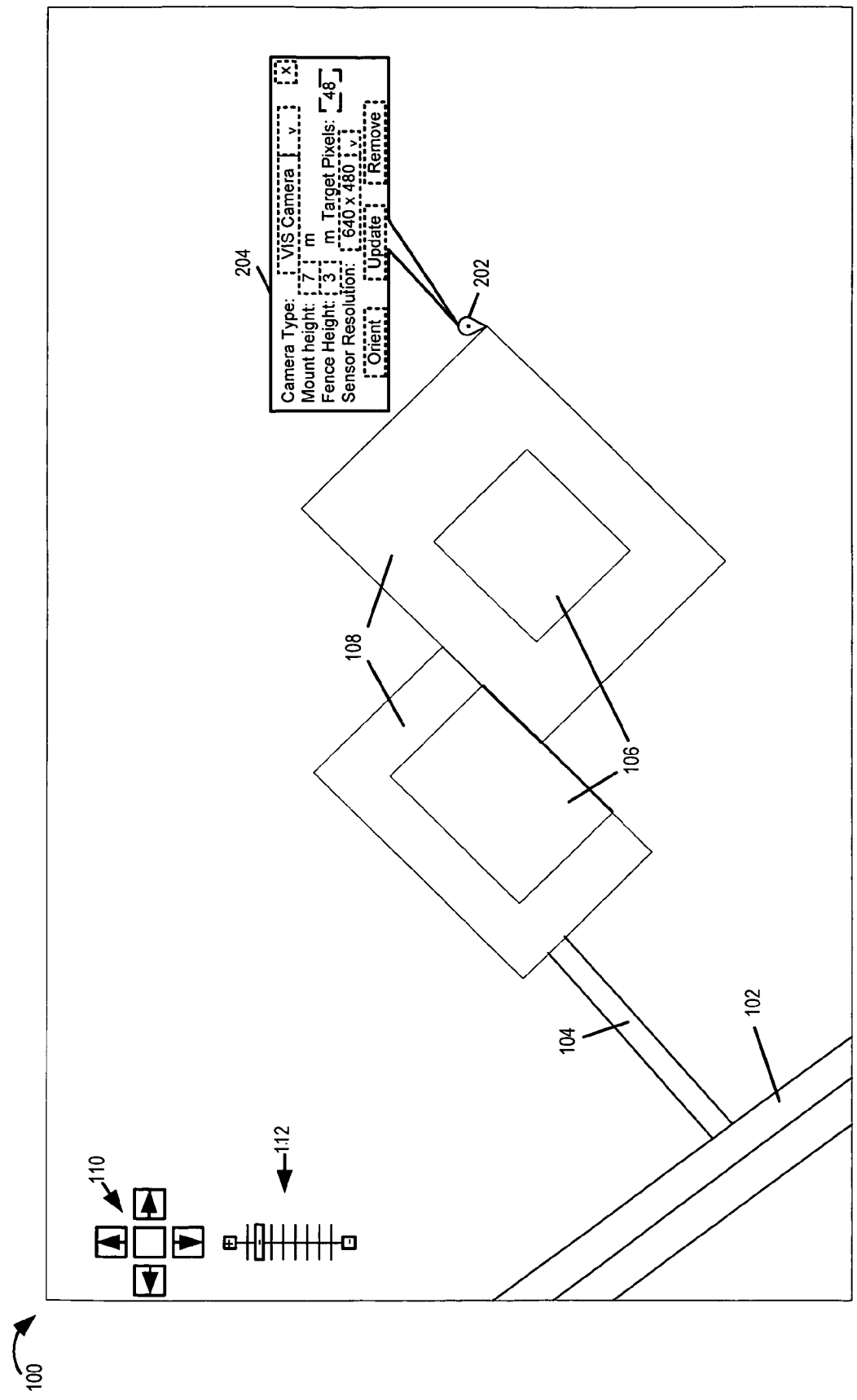
FIG. 2 is a drawing illustrating exemplary surveillance camera insertion into the exemplary map of FIG. 1.

Various embodiments of the present invention are directed to surveillance configuration tools, e.g., system planning programs, which interface with computer mapping service software. A user may locate a site of interest and insert one or more hypothetical surveillance cameras into the image. FIG. 2 is a drawing 200 illustrating exemplary surveillance camera insertion into the exemplary map of FIG. 1. The user can select a location to drop a camera onto the map, as indicated by the added teardrop 202. Then, the user can, e.g., via a menu 204, select various options to configure and orient the surveillance camera. For example, the user selects: the type of camera, e.g., visual or infrared, the camera mount height, the fence height, the target pixels, the sensor resolution, and the orientation for pointing the camera. The fence height represents the viewing height at the far end of the viewing range.

Figure 3:
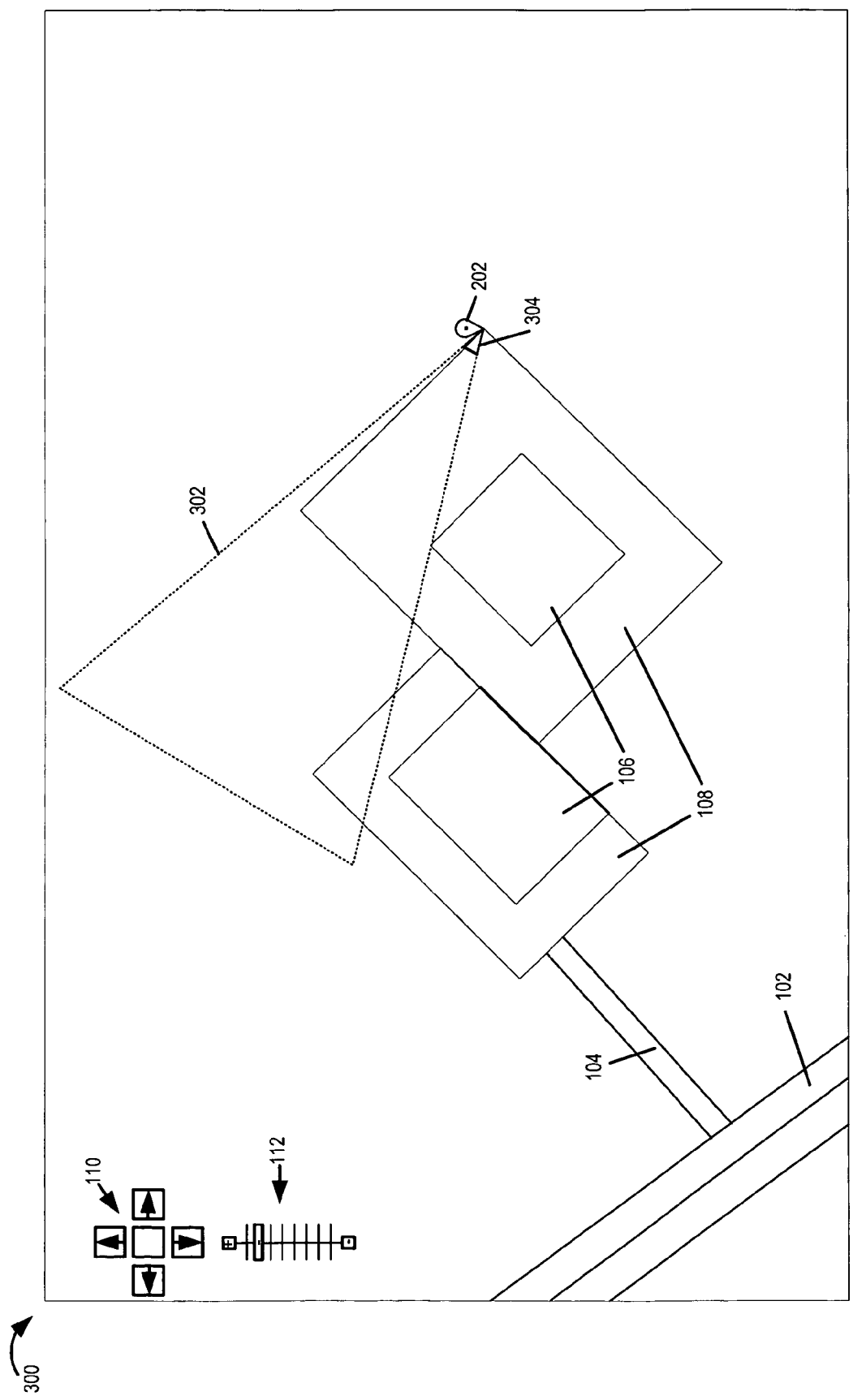
FIG. 3 is a drawing illustrating the exemplary surveillance area corresponding to the selections of FIG. 2.

FIG. 3 is a drawing 300 illustrating the exemplary surveillance area corresponding to the selections of FIG. 2. The exemplary dotted line substantially triangular shaped region 302 illustrates the surveillance area that will be covered, while the solid line substantially triangular shaped region 304 represents a blind zone, in the vicinity of camera, not covered by the surveillance camera.

Figure 4:
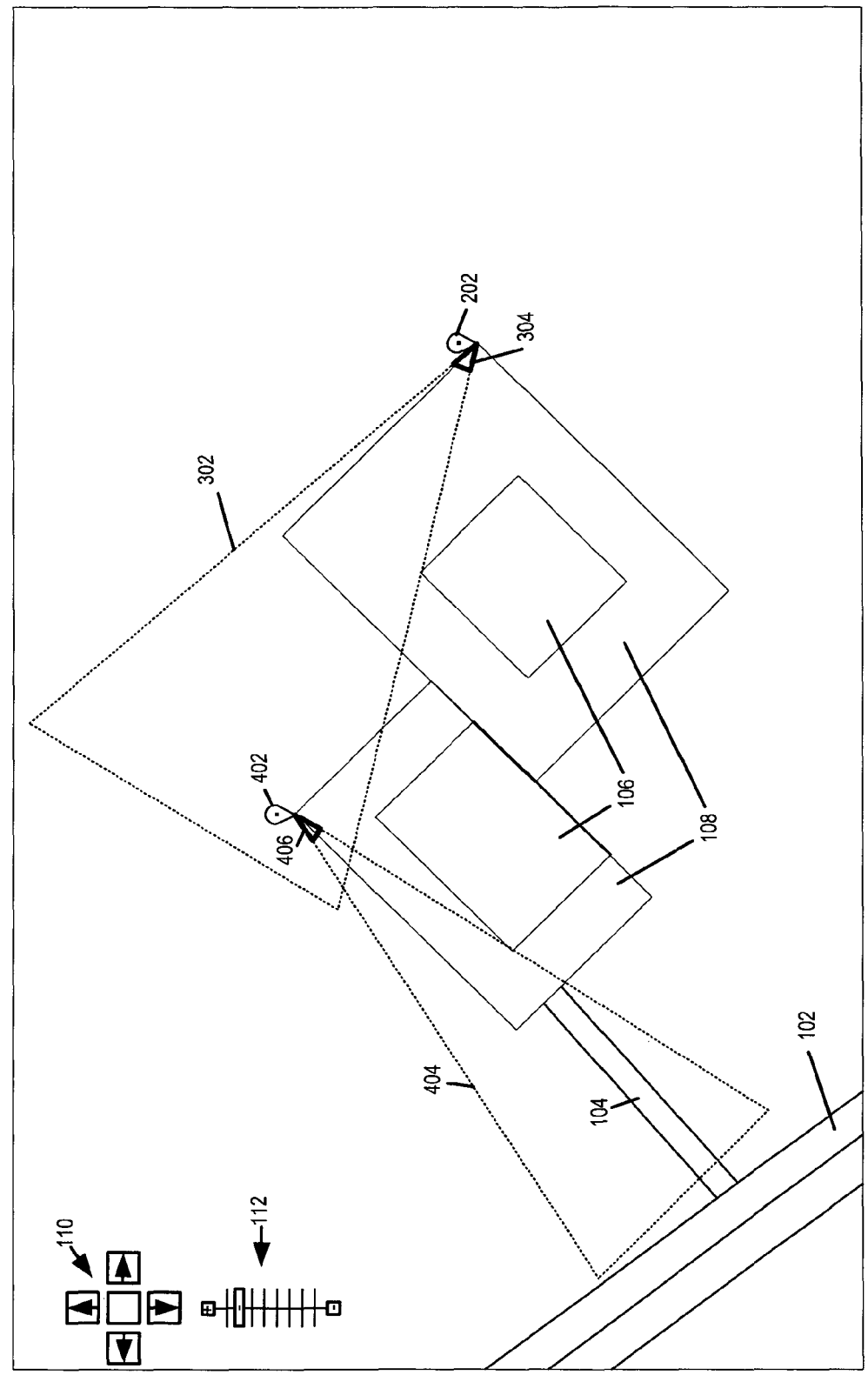
FIG. 4 illustrates that the user of the surveillance configuration tool has added a second surveillance camera.

FIG. 4 illustrates that the user of the surveillance configuration tool has added a second surveillance camera as indicated by teardrop 402. The exemplary dotted line substantially triangular shaped region 404 illustrates the surveillance area that will be covered by the second surveillance camera, while the solid line substantially triangular shaped region 406 represents a blind zone, in the vicinity of the second surveillance camera, not covered by the second surveillance camera.

Figure 5:
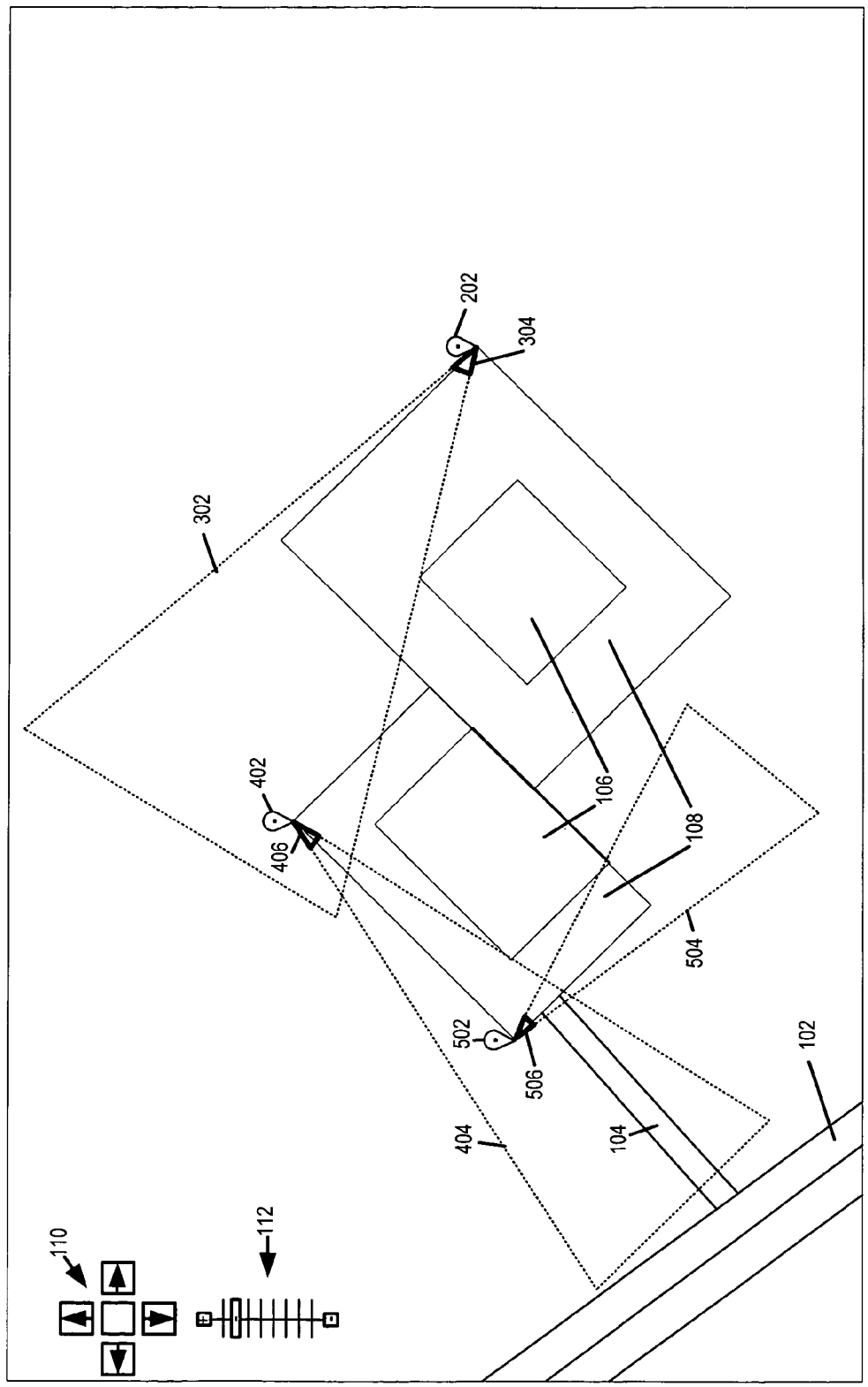
FIG. 5 illustrates that the user of the surveillance configuration tool has added a third surveillance camera.

FIG. 5 illustrates that the user of the surveillance configuration tool has added a third surveillance camera as indicated by teardrop 502. The exemplary dotted line substantially triangular shaped region 504 illustrates the surveillance area that will be covered by the third surveillance camera, while the solid line substantially triangular shaped region 506 represents a blind zone, in the vicinity of the third surveillance camera, not covered by the third surveillance camera.

Figure 6:
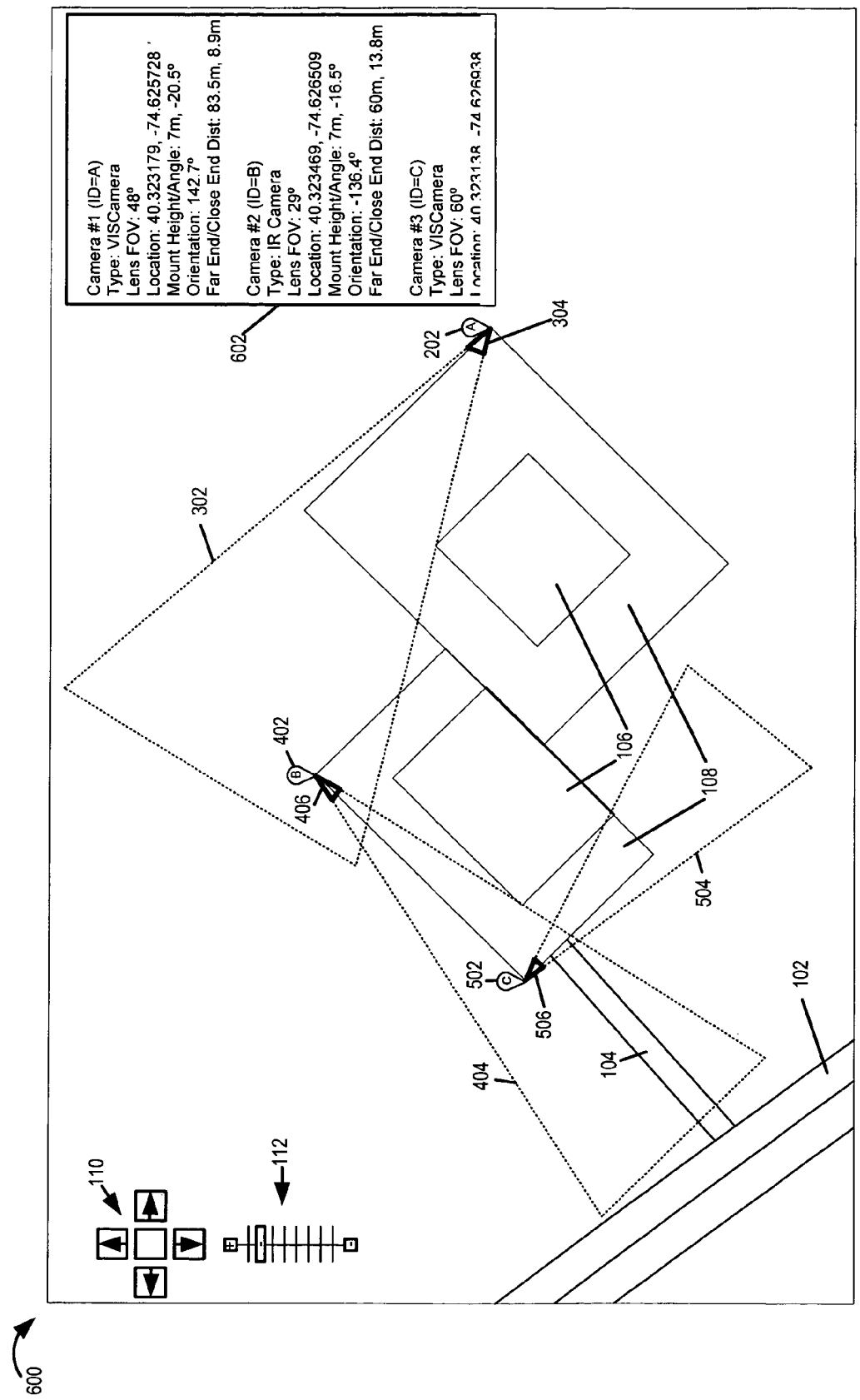
FIG. 6 is a drawing illustrating the exemplary surveillance regions of FIG. 5 and an exemplary camera configuration summarization output superimposed on the map.

FIG. 6 is a drawing 600 illustrating the exemplary surveillance regions of FIG. 5 and an exemplary camera configuration summarization output 602 superimposed on the map. FIG. 6 illustrates the surveillance configuration tool includes a camera configuration summarization output which indicates various options and setting which have been selected by the user in constructing the hypothetical surveillance system. For example, in this exemplary configuration, the user has selected two visible spectrum cameras and one infrared camera. Viewing range information is also included in the summary 602. In this embodiment, the user can scroll down through the summary to view information stored by not displayed, e.g., additional information corresponding to camera 3.

In various embodiments of the present invention, the configuration tool generates a purchase order and/or quotation corresponding to the virtual surveillance system which has been constructed. FIG. 7 is a drawing 700 of an exemplary generated purchase order corresponding to an exemplary surveillance kit for a new surveillance system represented by FIG. 6. In some embodiments, various components are added for communication, control, and/or monitoring functions. Various settings and options selected by the user are, in some embodiments, configured, set and/or marked at the factory, e.g., lens field of view, sensor resolution, target pixels, tilt angle adjustment, orientation, etc. These factor settings, in accordance with user planning selections, allow for a quick surveillance system in-field initial set up, and then the system can be fine tuned.

Various embodiments of the configuration tool are also used for upgrading of existing systems, e.g., adding additional cameras. In some such embodiments, configuration and/or setting information corresponding to an existing deployed in-field system, are stored, and made available to an authorized user.

Figure 8:
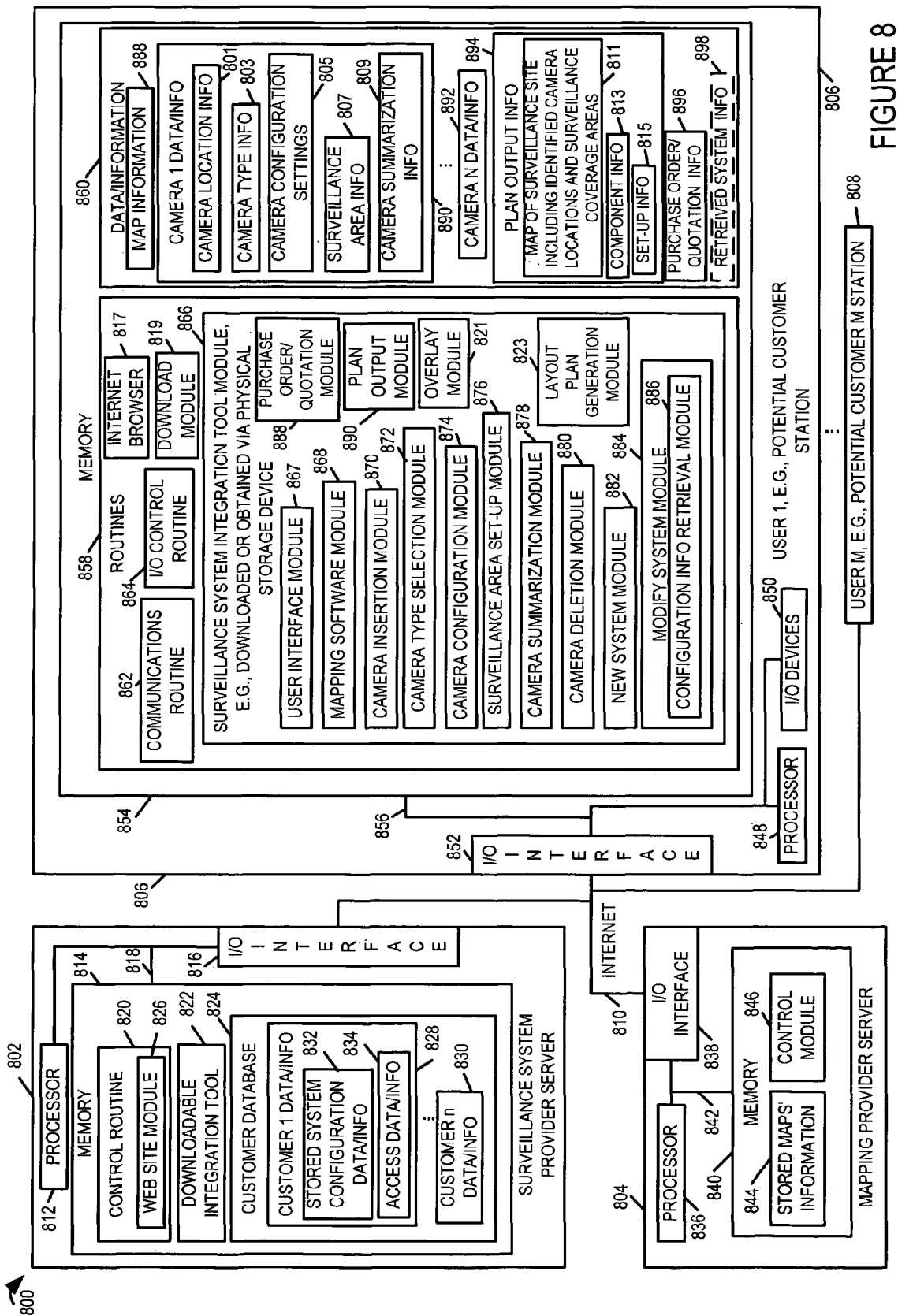
FIG. 8 is a drawing of an exemplary system in which users, e.g., potential customers, use an integration tool, in accordance with the present invention, to generate plan, model, develop and/or consider a camera based surveillance system.

FIG. 8 is a drawing of an exemplary system 800 in which users, e.g., potential customers, use an integration tool, in accordance with the present invention, to generate plan, model, develop and/or consider a camera based surveillance system. Exemplary system 800 includes a surveillance system provider server 802, a mapping provider server 804, and a plurality of user stations (user 1, e.g., potential customer 1, station 806, . . . , user M, e.g., potential customer M, station 808). The surveillance system provider server 802, the mapping provider server 804 and the user stations (806, . . . , 808) are coupled together via the Internet.

Surveillance system provider server 802 includes a processor 812, memory 814 and an I/O interface 816 coupled together via a bus 818 over which the various elements interchange data and information. I/O interface 816 couples the surveillance system provider server 802 to the Internet. Memory 814 includes routines and data/information. The processor 812, e.g., a CPU, executes the routines and uses the data/information in memory 814 to control the operation of server 802 and implement methods in accordance with the present invention. Memory 814 includes a control routine 820, a downloadable integration tool 822, and a customer database 824. The control routine 820 controls the operation of the server 802 including control of I/O interface 816. Control routine 820 includes a web site module 826. Web site module 826 controls functional operations related to operating the surveillance system provider's Web site, such operations including responding to user requests. User requests include, e.g., for example, a request to download the integration tool 822 to the user. Other user requests include, e.g., a request for system configuration information corresponding to an existing surveillance system, which the user, e.g., a past customer, is considering upgrading. Downloadable integration tool 822 is, e.g., a software program which interfaces with a mapping provider information and which allows a user to construct, view and output a hypothetical surveillance system implementation using smart cameras. The integration tool 822 allows a user which downloads the tool, to consider and evaluate various alternative scenarios for implementing a surveillance system, e.g., using different numbers of cameras, different placements of cameras, different types of cameras, different setting for cameras, and/or different orientations of cameras.

Customer database 824 includes a plurality of sets of customer data/information (customer 1 data/information 828, . . . , customer n data/information 830). Customer 1 data/information 830 includes stored system configuration data/information 832 and access data information 834. Stored system configuration data/information 832 includes, e.g., information corresponding to a currently deployed system such as, e.g., information corresponding to a set of deployed cameras including, e.g., camera type information, camera settings, camera orientation information, etc. Access data/ information 834 includes, e.g., passwords, encryption information, etc., used to limit access of customer information to authorized individuals.

Mapping provider server 804 includes a processor 836, an I/O interface 838 and a memory 840 coupled together via a bus 842 over which the various elements may interchange data and information. Memory 840 includes routines and data/information. The processor 836, e.g., a CPU, executes the routines and uses the data/information in memory 840 to control the operation of server 804. Memory 840 includes stored maps' information 844 and control module 846. Mapping server provider 804 corresponds to a free mapping service provider, a fee based mapping service provider, and/or a restricted viewing provider. For example, the mapping service provider providing free information may provide views of unrestricted locations in its database; however the images may be somewhat stale, e.g., images corresponds to 1 year old satellite photos. As another example, the mapping service provider providing fee base maps may provide relatively current satellite images, e.g., less than a month old, less than several days old, less than a day old, less than several hours or an hour old, or near real time. As another example, the mapping service provider providing restricted map images may provide satellite photos corresponding to restricted or controlled sites, e.g., military bases, airports, critical infrastructure, etc.

User 1, e.g., potential customer 1, station 806 includes a processor 848, I/O devices 850, I/O interface 852, and memory 854 coupled together via bus 856 over which the various elements may interchange data and information. Memory 854 includes routines 858 and data/information 860. The processor 848, e.g., a CPU, executes the routines 858 and uses the data/information 860 in memory 854 to control the operation of the user station 806 and implement methods in accordance with the present invention.

I/O interface 852, e.g., including a wire based interface module, fiber optic based interface module, and/or wireless based interface module, couples the user station 858 to the Internet, thus facilitating interaction with the surveillance system provider server 802 and mapping provider server 804. I/O devices 850, e.g., keyboard, keypad, touchscreen, mouse, microphone, display, speaker, printer, etc., allow a user to interact with the surveillance system provider server's Web site, e.g., requesting the downloadable integration tool, place order, access stored configuration information, etc. I/O devices 850 also allow a user to operate the surveillance system integration tool module 866, e.g., inserting cameras, selecting between various options and alternatives in constructing and planning a surveillance system. I/O devices 850 also allow a user to view and/or obtain hardcopy of a layout of the potential surveillance system, component information, configuration information, orientation information, purchase order information, and/or quotation information.

Routines 858 include a communications routine 862, I/O control routines 864, an Internet browser 817, a download module 819, and surveillance system integration tool module 866. Communications routine 862 implements the various communications protocols used by the user station 806. I/O control routine 864 controls operation of I/O interface 852 and I/O devices 850. Download module 819 is used for downloading information from other nodes, e.g., downloading a map, e.g., a satellite based map, from mapping provider server 804 via the Internet and/or downloading at least a portion of a surveillance system integration tool, e.g., from surveillance system provider server 802 via the Internet. Internet browser 817 is used to establish and maintain communications with various Web sites, e.g., a Web site of a surveillance system provider and/or a Web site of a mapping provider. Internet browser 817 is also used to trigger executing of at least some computer instruction included in surveillance system integration tool module.

Surveillance system integration tool module 866 performs various operations related to modeling, constructing, viewing, implementing, planning, upgrading and/or purchasing a surveillance system or surveillance system components. Surveillance system integration tool module 866 is, e.g., downloaded from surveillance system provider server 802 or obtained via a physical storage device such as CD or DVD which has been provided to the user by the surveillance system provider and installed in station 806.

Surveillance system integration tool module 866 includes a user interface module 867, a mapping software module 868, a camera insertion module 870, a camera type selection module 872, a camera configuration module 874, a surveillance area set-up module 876, a camera summarization module 878, a camera deletion module 880, a new system module 882, a modify system module 884, an overlay module 821, a layout plan generation module 823, a purchase order/quotation module 888, and a plan output module 890. Modify system module 884 includes a configuration information retrieval module 886.

User interface module 867 performs user interface operations related to the surveillance system integration tool, e.g., generating input menus, switching between alternate menus, prompting a-user, receiving input from a user, e.g., a camera type selection, etc.

Mapping software module 868 interfaces with a mapping service provider and generates map images for the user to overlay surveillance system related information on. Camera insertion module 870 is responsive to user input, inserting cameras onto a map. Camera type selection module 872 is responsive to user input which selects between the plurality of alternative cameras, processing the input, and storing the selection. Camera configuration module 874 obtains user selected camera setting, e.g., sensor resolution, and determines camera settings, e.g., field of view, tilt angle, etc. Surveillance area set up module 876 is responsive to user input pertaining to surveillance area, e.g., a camera placement, a camera orientation direction, a far end viewing height, processes the input, determines a camera surveillance area, and generates an indication for overlay on a map of the surveillance area. Camera summarization module 878 summarizes surveillance system information related to cameras placed in the surveillance system, e.g., the summarization of block 602 of FIG. 6. Camera deletion module 880, which is responsive to user input, deletes cameras from a map.

New system module 882 is used to generate a plan for a potential new surveillance system. Modify system module 884 is used to generate a plan for modifying a plan corresponding to an existing surveillance system or a previously stored surveillance system plan corresponding to a potential system. Modify system module 884 includes configuration information retrieval module 886 which retrieves stored information corresponding to an existing system, e.g., stored system configuration data/info 832 from surveillance system provider server 828.

Overlay module 821 overlays a camera position indicator and a surveillance area indicator on a map. Layout plan generation module 823 generates a surveillance layout plan including at least one camera position indicator and a corresponding surveillance coverage area indicator. Plan output module 890 outputs a generated layout plan to at least one of a communications network, a printer, and an output device. Purchase order/quotation module 888 generates a purchase order and/or quotation corresponding to a generated surveillance system plan. Purchase order/quotation module 888, is responsive to input from new system module 882 and modify system module 884, e.g., information identifying whether the purchase order and/or quotation corresponds to a new system or a system upgrade. In some embodiments, e.g., in response to a new system, the purchase order/quotation module 888 lists, e.g., as part of a default, at least some components which are not visibly displayed on the map of the generated plan, but which are necessary or beneficial to implement a system corresponding to the surveillance layout plan. For example, the additional components, in some embodiments, include at least one of a router, camera mount kit, central controller module, a monitor station, an alarm station, and a combined monitoring/alarm station.

Data/information 860 includes map information 888, a plurality of sets of camera data/information (camera 1 data/information 890, camera N data/information 892), plan output information 894 and purchase order/quotation information 896. Data/information 860 may also include retrieved system information 898, e.g., in the case where a user is considering an upgrade to an existing surveillance system.

Map information 888 includes information obtained from mapping service provider, e.g., map of FIG. 1, map alteration control information, e.g., for resizing and/or changing the map viewing area, and information to be placed as an overlay on the map, e.g., inserted camera location designations, identified surveillance areas, and information summaries.

Camera 1 data/information 890 includes camera location information 801, camera type information 803, camera configuration settings information 805, surveillance area information 807, and camera summarization information 809. Camera location information 801 is, e.g., latitude/longitude coordinates, UTM coordinates, etc., corresponding to inserted cameras. Camera type information 803, includes, e.g., information associated with an inserted camera identifying a user selected camera type, e.g., a first type of visual spectrum camera, a second type of visual spectrum camera, a first type of IR spectrum camera, a second type of IR spectrum camera, a first type of hybrid visual/IR spectrum camera or a second type of hybrid visual/IR spectrum camera. Camera configuration setting 805 includes, e.g., user selected sensor resolution, lens type, user selected target pixels, and determined field of view. Surveillance area information 807 includes, e.g., user selected mount height, user selected fence height, user selected orientation, determined orientation angle, determined camera mount angle, determined far end surveillance distance, determined close end surveillance distance, and obstruction information. Camera summarization information 809 includes a set of information characterizing the camera 1 and the surveillance envelope, e.g., first set of information in block 602 of FIG. 6.

Plan output information 894 includes a map of a surveillance site including identified camera locations and surveillance coverage areas 811 component information 813, and set-up information 815. Plan output information 894, e.g., in combination with purchase order/quotation information 896, provides the user with a useful coordinated package of information which may be included in a presentation or proposal in regard to implementing and/or upgrading a surveillance system at a site of interest.

Map information 811 is, e.g., the map of FIG. 5, e.g., a satellite base map image showing smart surveillance camera locations and identifying corresponding surveillance coverage areas.

Component information 813 includes, e.g., camera type, e.g. visual or IR. Set-up information 815 includes information selected by the user and information calculated and/or determined by the integration tool, e.g., in response to user inputs. Information selected by the user includes, e.g., camera mount height, fence height, sensor resolution, target pixels, camera placement on map, camera orientation. Information calculated and/or determined by the integration tool includes, e.g., lens field of view, camera location information such as latitude/longitude coordinates corresponding to an inserted camera, camera mount height, camera tilt angle, camera orientation, e.g., in degrees with respect to a reference, far end distance of surveillance envelope, close end distance of surveillance envelope.

Purchase order/quotation information 896 is, e.g., a generated purchase order and/or a generated quotation for a surveillance kit such as that of drawing 700 of FIG. 7 or a generated purchase order and/or quotation corresponding to system components in which the user has an interest, e.g., as part of an upgrade. Purchase order/quotation 896 lists at least some of the cameras indicated in the generated surveillance area layout plan. In some embodiments, for at least some purchase orders or quotations, the purchase order or quotation also includes at least some additional components which are not visually displayed in the map but are necessary to implement a system corresponding to the surveillance layout plan, e.g., at least one of a router, camera mount kit, central controller module, monitor station, an alarm station, and a combined monitoring/alarm station. Retrieved system information 898 corresponds, e.g., to information which has been downloaded from stored system configuration data/information, e.g., data/information 832.

Figure 9A:
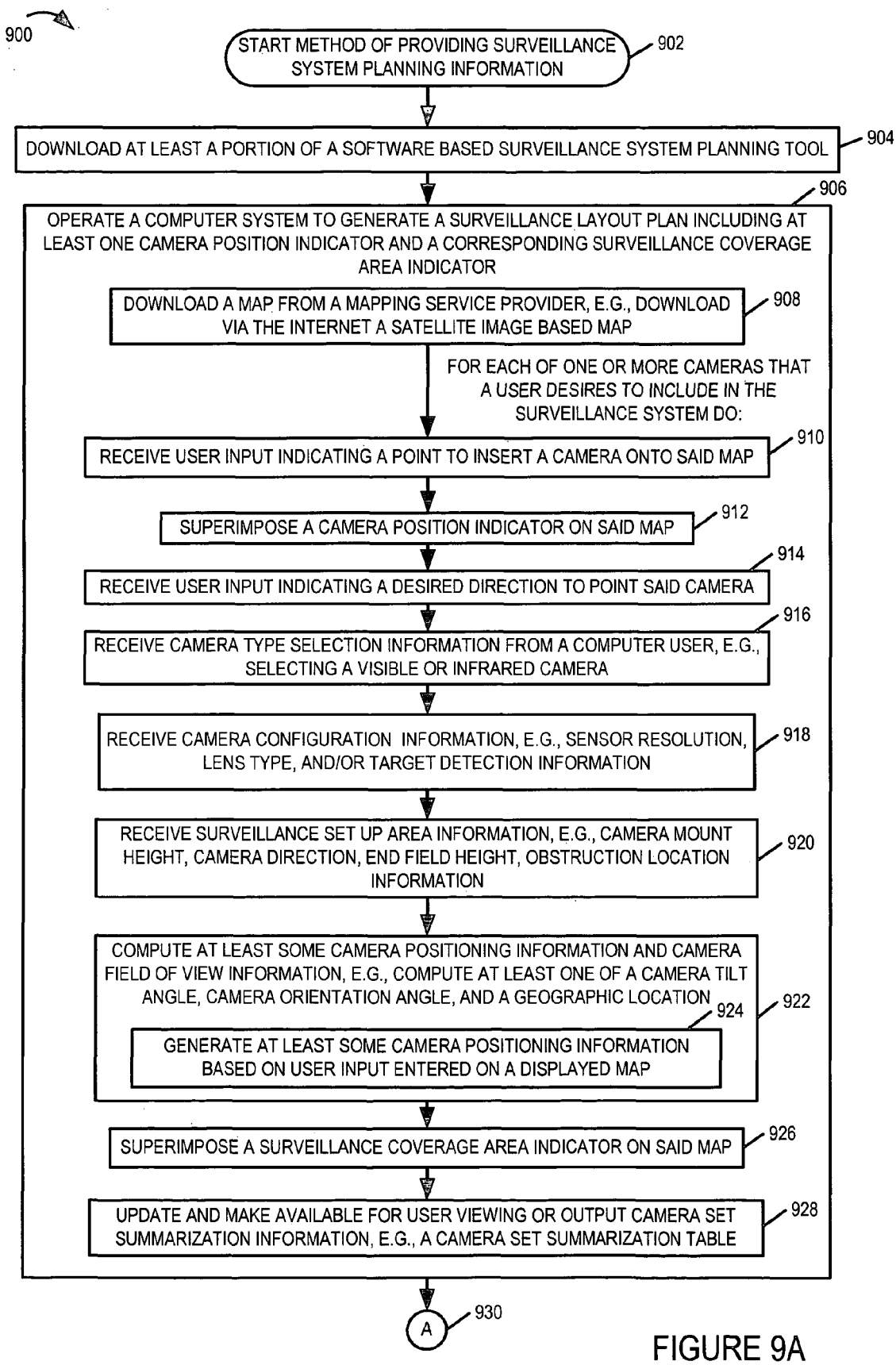
FIG. 9 comprising the combination of FIG. 9A
FIG. 9B is a drawing of a flowchart of an exemplary method of providing surveillance system planning information.
Figures 9, 9A, 9B:
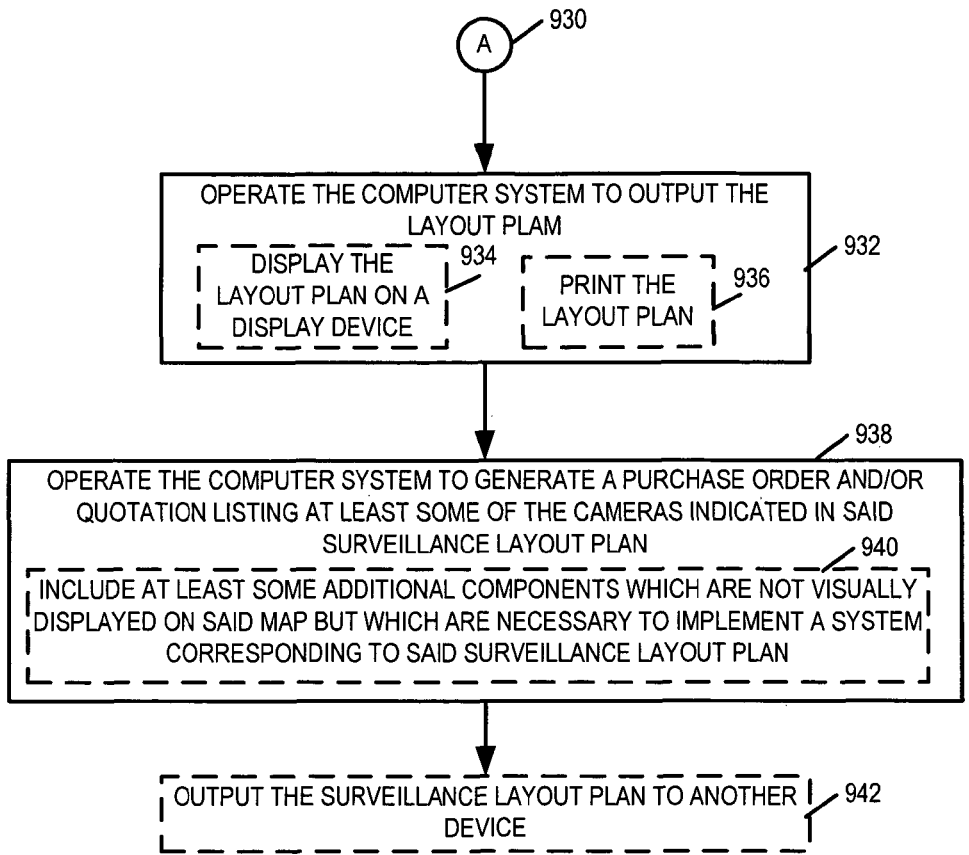

FIG. 9 comprising the combination of FIG. 9A and FIG. 9B is a drawing of a flowchart 900 of an exemplary method of providing surveillance system planning information. Operation starts in step 902, where a user's computer system is powered on and initialized and proceeds to step 904.

In step 904, the computer system is operated to download at least a portion of a software based surveillance system planning tool, e.g., via the Internet. In some embodiments, the at least a portion of a software based surveillance system is loaded into the computer system from a physical storage device, e.g., a CD or DVD. Operation proceeds from step 904 to step 906.

In step 906, the computer system is operated to generate a surveillance layout plan including at least one camera position indicator and a corresponding surveillance coverage area indicator. In various embodiments, operating the computer system to generate a layout plan includes executing at least some of computer instructions in said downloaded portion of the software based surveillance system planning tool. In some such embodiments, an Internet browser is used to trigger executing at least some of said computer instructions.

Step 906 includes sub-steps 908, 910, 912, 914, 916, 918, 920, 922, 926, and 928. In sub-step 908, the computer system downloads a map from a mapping service provider. For example, the map may be downloaded via the Internet and the map may be a satellite image based map.

For each of one or more cameras that a user desires to include in the surveillance system, sub-steps 910, 912, 914, 916, 918, 920, 922, 926 and 928 are performed. In sub-step 910, the communications device is operated to receive user input indicating a point to insert a camera onto said map. Then, in sub-step 912, the computer system is operated to superimpose a camera position indicator on said map. For example, the camera position indicator may be a symbol such as a teardrop. Operation proceeds from sub-step 912 to sub-step 914. In sub-step 914, the computer system is operated to receive user input indicating a desired direction to point said camera. In sub-step 916, the computer system is operated to receive camera type selection information from a computer user. For example, the user may select, e.g., via a pull-down menu, one of a visible spectrum type camera and an infrared spectrum type camera. In sub-step 918, the computer system is operated to receive camera configuration information. For example, the computer system may prompt the user to select between alternative sensor resolution settings, select between alternative lens types, and/or provide target detection information, e.g., a minimum number of pixels designating a target, and then the computer system receives the user inputs. In sub-step 920, the computer system receives surveillance area set-up information, e.g., a camera mount height, camera direction, end field height, and/or obstruction location information. Operation proceeds from sub-step 920 to sub-step 922.

In sub-step 922, the computer system is operated to compute at least some camera positioning information and camera field of view information, e.g., compute at least one of a camera tilt angle, camera orientation angle, and a geographic location. Sub-step 922 includes sub-step 924. In sub-step 924, the computer system is operated to generate at least some camera positioning information based on user input entered on a displayed map. For example, the user indicates a camera insertion point by clicking on a point on the map, and the corresponding set of latitude/longitude coordinates are generated.

Operation proceeds from sub-step 922 to sub-step 926. In sub-step 926, the computer system is operated to superimpose a surveillance coverage area indicator on said map. For, example, the surveillance coverage area indicator may be a substantially triangular shaped overlay. Operation proceeds from sub-step 926 to sub-step 928. In sub-step 928, the computer system is operated to update and make available for user viewing or output camera set summarization information, e.g., a camera set summarization table. Block 602 of FIG. 6 is an exemplary camera set summarization table.

Operation proceeds from step 906 via connecting node A 930 to step 932. In step 932, the computer system is operated to output the layout plan. Step 932 includes one or more of sub-step 934 and 936. In sub-step 934, the computer system is operated to display the layout plan on a display device, e.g., a computer monitor screen. In sub-step 936, the computer system is operated to print the layout plan. Operation proceeds from step 932 to step 938.

In step 938, the computer system is operated to generate a purchase order and/or quotation listing at least some of the cameras indicated in said surveillance plan. In some embodiments, for at least some generated surveillance plans, the computer system is operated to include at least some additional components which are not visibly displayed on said map but which are necessary to implement a system corresponding to said surveillance layout plan. In some embodiments, the additional components include at least one of: a router, camera mount kit, central controller module, a monitor station, an alarm station, and a combined monitoring/alarm station.

In some embodiments, step 942 is performed in which the computer system outputs the surveillance layout plan to another device. For example, in step 932, the layout plan may have been displayed on a computer screen, while in step 942, the surveillance layout plan is directed to a printer, e.g., so that the surveillance layout plan can be conveniently included in a presentation or proposal with the generated purchase order and/or quotation.

Figure 10:
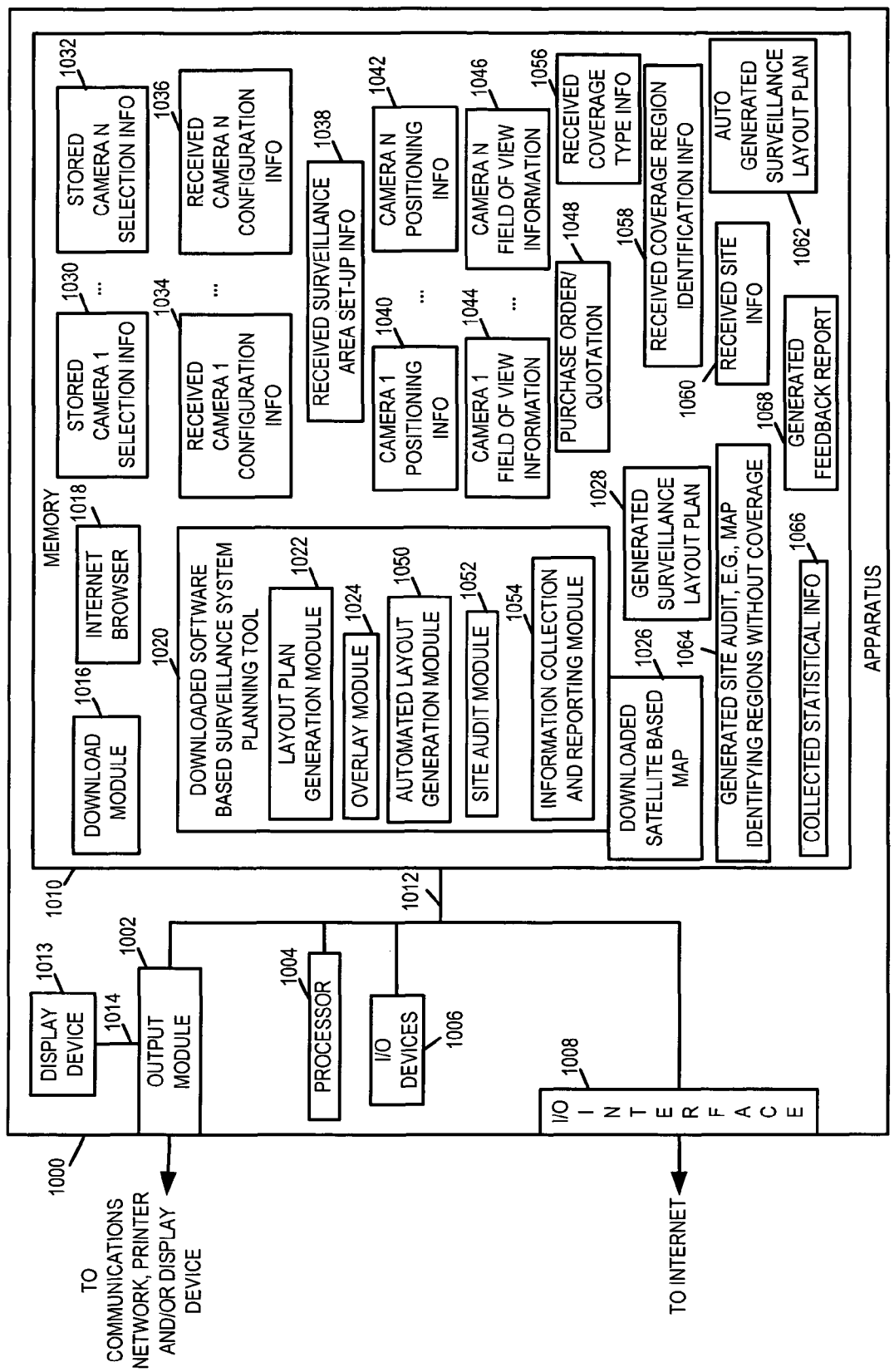
FIG. 10 is a drawing of an exemplary apparatus, e.g., a computer system, in accordance with various embodiments of the present invention.

FIG. 10 is a drawing of an exemplary apparatus 1000, e.g., a computer system, in accordance with various embodiments of the present invention. Exemplary apparatus 1000 may be an alternate embodiment of any of the user stations (806, 808) of system 800 of FIG. 8. Apparatus 1000 is capable of providing surveillance system planning information.

Exemplary apparatus 800 includes an output module 1002, a processor 1004, I/O devices 1006, I/O interface 1008 and memory 1010 coupled together via bus 1012 over which the various elements may interchange data and information. Memory 1010 includes routines and data/information. The processor 1004, e.g., a CPU, executes the routines and uses the data/information in memory 1010 to control the operation of apparatus 1000 and implement methods in accordance with the present invention.

I/O device 1006 include, e.g., keyboard, keypad, switches, mouse, touch-screen, microphone, display, printer, speaker, etc., which allow a user of apparatus 1000, e.g., a customer or potential customer of a surveillance system, to input data/information and output results. Some exemplary operator inputs include, e.g., download request of map, download request of at least a portion of a surveillance system planning tool, camera insertion command, camera deletion command, camera configuration information, camera surveillance area information, camera type selection, request for a plan, request for a purchase order, and a request for quotation. Some exemplary output results include, e.g., a generated surveillance layout plan, a generated automated surveillance plan, a generated site audit, and a generated purchase order and/or a generated quotation.

I/O interface 1008 couples the apparatus to the Internet via which the apparatus can communicate with other nodes and receive information. For example, via I/O interface 1008 the apparatus 1000 can a download satellite based map from a map provider server and/or download at least a portion of a software based surveillance system planning tool from a surveillance system provider's server.

Output module 1014 is coupled to display device 1013, e.g., a monitor, via link 1014. Output module 1002 also couples the apparatus 1002 to a communications network, printer and/or display devices, e.g., external to apparatus 1000. Output module 1014 can, and sometimes does, output generated surveillance layout plans to at least one of a communications network, a printer and a display device.

Memory 1010 includes a download module 1016, an Internet browser 1018, and a downloaded software based surveillance system planning tool 1020. The surveillance system planning tool 1020 includes a layout plan generation module 1022, an overlay module 1024, an automated layout generation module 1050, a site audit module 1052 and an information collection and reporting module 1054. Layout plan generation module 1022 generates a surveillance layout plan including at least one camera position indicator and a corresponding surveillance coverage area indicator. Overlay module 1024 overlays a camera position indicator and a surveillance area indicator on a map. Download module 1016 is used for downloading information from external nodes. Download module 1016 can and sometimes does download a map from a map providing server. Download module 1016 is coupled to the Internet via I/O interface 1008, and downloading of a map, e.g., a map based on a satellite image, is sometimes performed via the Internet from a mapping provider server. Download module 1016 can, and sometimes does, download at least a portion of a software based surveillance system planning tool via the Internet. Internet browser module 1018 is used to trigger executing of at least some computer instructions included in said at least a portion of a software based surveillance system planning tool.

The automated layout generation module 1050 uses data information identifying the type of coverage, coverage area, and/or other coverage constraints to generate auto generated surveillance layout plan 1062. For example, automated layout generation module 1050 receives user input information identifying: (i) a type of coverage desired, e.g., one of perimeter coverage and area coverage, (ii) information identifying a desired surveillance region, e.g., a region identified by a user drawing on a map via a mouse, and (ii) information identifying constraints such as a certain area is unsuitable for the placement of cabling. The automated layout generation module 1050 processes the received information and generates a surveillance plan, e.g., selecting suitable cameras, camera settings, and recommending placement of the cameras, identifying where wired communications and where wireless communications are to be used, identifying wireless receiver placement, and generates a map including an overlay illustrating the auto generated surveillance plan.

The site audit module 1052 generates site audit 1064, identifying regions which are not covered by the surveillance system. The generated site audit can be useful to identify which areas are at risk and can also be useful in considering upgrading of an existing system.

In some embodiments the site audit is implemented by operating a computer system to generate surveillance system audit information which may be included or output, e.g., as an audit plan which can be displayed and/or printed. The audit plan may be implemented as a site map overlaid with various information and indicators. In one exemplary embodiment the audit module identifies one or more areas lacking surveillance coverage; generates and outputs an audit plan indicating the determined one or more area lacking surveillance coverage. The audit plan may be output to, e.g., a communications network, a printer and a display device. The audit method and generation of an audit plan may include operating the audit plan module to overlay indicators of coverage areas lacking surveillance coverage on a site map to create the site audit plan. The audit plan can, and often is, displayed on a display device with the audit plan visibly including information indicating areas lacking coverage on a site map which is displayed as part of the audit plan. The audit module may, and in various embodiments does, also automatically suggest camera types and positions which can improve site coverage, e.g., reduce or eliminating areas lacking coverage. The audit module may overlay suggested camera positions for improving site coverage on said site audit plan. In some embodiments the audit module also overlays exiting camera positions on the generated site audit plan. Existing camera position information and other information used to generate the site audit plan may be input by a user of the computer system, e.g., with the user specifying existing camera locations.

Information collection and reporting module 1054 collects information derived from the use of the planning tool, generates feedback information, e.g., generated feedback report 1068 and communicates the feedback information to a central server, e.g., surveillance system provider server 802. Information collection and reporting module 1054 collects statistical information including, e.g., area sizes being considered for surveillance, numbers and types of cameras selected, type of surveillance, e.g., perimeter or area, etc. This collected information reported back to the surveillance system provider can provide valuable information for sales, marketing and/or product development purposes.

Memory 1010 also includes stored camera selection information (stored camera 1 selection information 1030, . . . , stored camera N selection information 1032), camera configuration information (received camera 1 configuration information 1034, . . . , received camera N configuration information 1036), received surveillance area set-up information 1038, camera positioning information (camera 1 positioning information 1040, . . . , camera N positioning information 1042), camera field of view information (camera 1 field of information 1044, . . . , camera N field of view information 1046), a downloaded satellite based map 1026, a generated surveillance layout plan 1028, and a purchase order/quotation 1048. Memory 1010 also includes received coverage type information 1056, received coverage region identification information 1058, received site information 1060, an automated generated surveillance layout plan 1062, a generated site audit 1064, collected statistical information 1066, and a generated feedback report 1068.

Stored camera type selection information (1030, . . . , 1032), e.g., information identifying whether a camera is a visible spectrum or IR type camera, was received from a user of apparatus 1000, e.g., via I/O devices 1006. Received camera configuration information (1034, . . . , 1036) includes at least one of sensor resolution information, lens type information, and target detection information. Received surveillance area set-up information 1038 includes at least one of camera height, camera direction, end field height and obstruction location information. Camera positioning information (1040, . . . 1042) includes at least one of a camera tilt angle, a camera orientation angle, and a geographic camera location. In some embodiments, at least some camera positioning information is generated based on user input entered on a displayed map. Camera field of view information 1044 includes at least one of: a field of view angle, a far end viewing distance and a close end viewing distance. Generated surveillance layout plan 1028 includes, e.g., a satellite based map with an overlay including at least one camera position indicator and a corresponding surveillance area coverage indicator. The generated surveillance layout plan can, and sometimes does, include summarization information corresponding to the cameras being used in the plan. The summarization information includes, e.g., camera configuration information and/or surveillance system set-up information. Purchase order/quotation 1048 lists at least some of the cameras indicated in a generated surveillance layout plan. In some embodiments, the purchase order/quotation 1048 includes at least some additional components which are not visibly displayed on said map but which are necessary to implement a system corresponding to the generated surveillance layout plan 1028. In some such embodiments, the additional components include at least one of a router, camera mount kit, central controller module, a monitor station, an alarm station, and a combined monitoring/alarm station.

Received type coverage information 1056 is, e.g., a received user input identifying a user selection between a perimeter type of surveillance system and an area based surveillance system. Received coverage region information 1058 is, e.g., received user input identifying a portion of a presented map which corresponds to the site of interest for surveillance. For example, a user may identify a coverage region for surveillance by drawing a boundary around, highlighting, or otherwise identifying, e.g. via a mouse or input coordinate information, a desired surveillance region on a map. Received site information 1060 includes, e.g., user input identifying information about the surveillance site, e.g., portion of the site may be unsuitable for trenching and installing buried cables, specifications related to structures and/or other site obstruction elements, e.g., height of a building, external lighting present, etc. Automated generated surveillance layout plan 1062 is an output of automated layout generation module 1050. For example, the automated generated surveillance layout plan 1062 includes a map with an overlay including at least one camera location indication whose placement has been determined by the automated layout generation module 1050, e.g., using the input information identifying coverage type and/or identified desired coverage region. Generated site audit 1064, and output of site audit module 1052, is, e.g., a map identifying regions without surveillance coverage. Drawing 1100 of FIG. 11 is such and exemplary site audit map.

Collected statistical information 1066 includes collected information pertaining to the use of planning tool 1020, e.g., size of site surveillance region such as less than of equal to 1 square mile, between 1 and 10 square miles, greater than 10 square miles, etc., type of surveillance considered such as perimeter or area, target information, types of camera selected, number of camera selected, etc. Generated feedback report 1068 is a report generated to convey at least some of collected statistical information 1066 to a server, e.g., surveillance system provider server 802 of FIG. 8.

Figure 11:
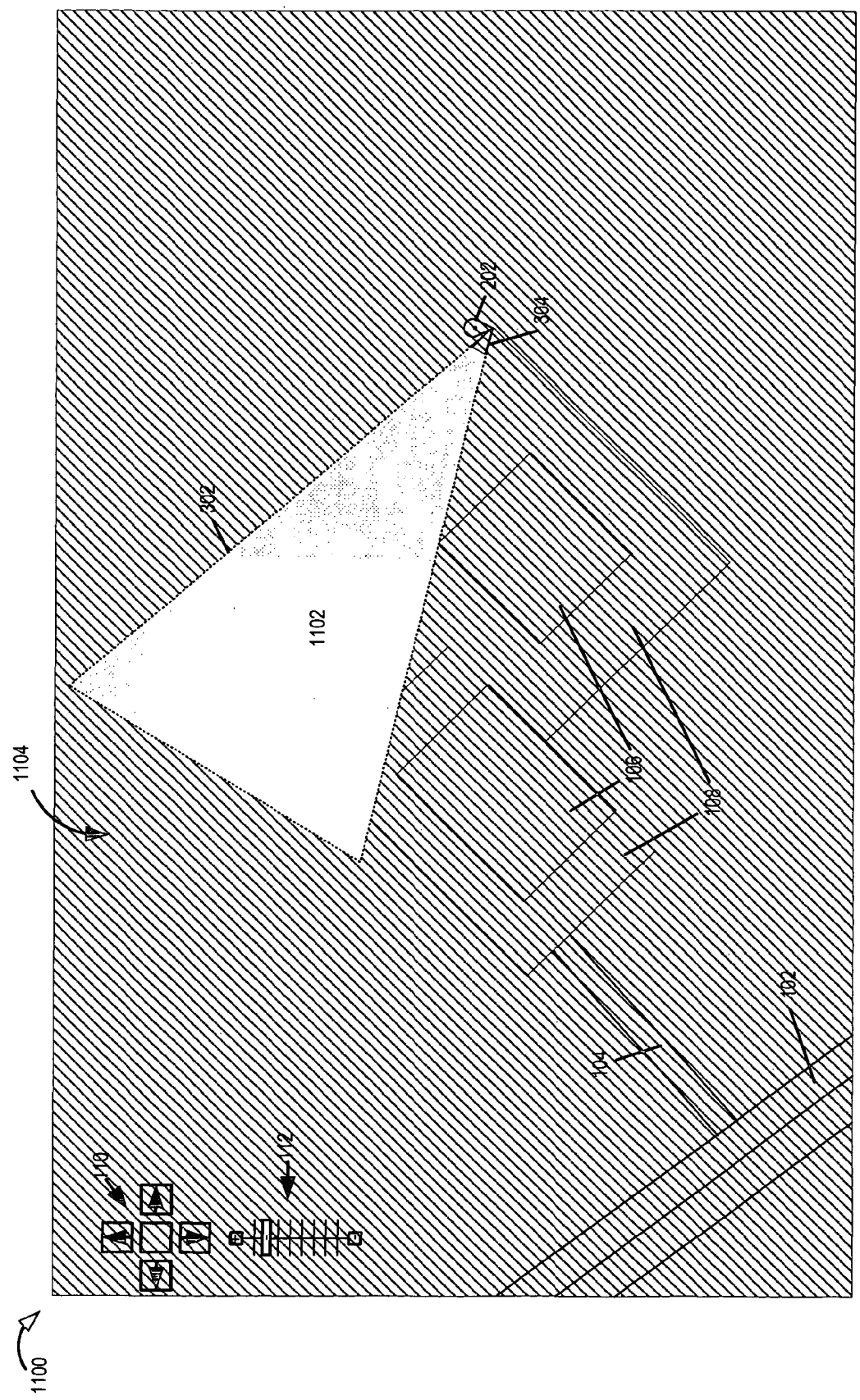
FIG. 11 is a drawing illustrating an area not covered by the exemplary surveillance set-up corresponding to FIG. 2.

FIG. 11 is a drawing illustrating an area not covered by the exemplary surveillance set-up corresponding to of FIG. 2. In various embodiments, of the present invention, the surveillance system planning tool identifies the regions on a map in which a surveillance system does not provide coverage. In drawing 1100 of FIG. 11, the region 1104 identified by diagonal line shading represents the areas for which surveillance is not provided, while the region 1102 represents the region where surveillance is provided.

In some embodiments, many or all of the functions and/or steps used to implement the invention may be performed in a remote, e.g., network based server such as surveillance system provider server 802, with the user, e.g., customer station 806 or 1000 acting as an interface/display module with many or all of the computations being performed in the remote server.

In various embodiments elements described herein are implemented using one or more modules to perform the steps corresponding to one or more methods of the present invention. Thus, in some embodiments various features of the present invention are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, the present invention is directed to a machine-readable medium including machine executable instructions for causing a machine, e.g., processor and associated hardware which may be part of a test device, to perform one or more of the steps of the above-described method(s).

Numerous additional variations on the methods and apparatus of the present invention described above will be apparent to those skilled in the art in view of the above description of the invention. Such variations are to be considered within the scope of the invention.

What is claimed is:

1. A method of providing surveillance system planning information, the method comprising:
   operating a computer system to generate a surveillance layout plan showing an area subject to surveillance, said layout plan including a first camera position indicator indicating a first camera position and a first finite camera coverage area indicator indicating a first finite coverage area corresponding to a first camera whose position is indicated by said first camera position indicator; and
   operating the computer system to output said layout plan.

2. The method of claim 1, wherein operating the computer system to output said layout plan includes at least one of displaying said layout plan on a display device and printing said layout plan.

3. The method of claim 2, wherein operating a computer system to generate a surveillance layout plan includes operating the computer system to:
   superimpose said camera position indicator and said first finite camera coverage area indicator on a map.

4. The method of claim 3, wherein operating a computer system to generate a surveillance layout plan further includes operating the computer system to:
   download said map from a map providing server, said downloading is preformed via the Internet and wherein said map providing server provides said map based on a satellite image.

5. The method of 4, further comprising:
   downloading at least a portion of a software based surveillance system planning tool prior to operating the computer system to generate said surveillance layout plan; and
   wherein operating the computer system to generate the surveillance layout plan includes executing at least some computer instructions in said downloaded portion of said software based surveillance system planning tool.

6. The method of claim 5, wherein an Internet browser is used to trigger executing of said at least some computer instructions.

7. The method of claim 2, wherein operating a computer system to generate a surveillance layout plan further includes:
   receiving camera type selection information and camera configuration information from a computer system user.

8. The method 7, wherein operating a computer system to generate a surveillance layout plan further includes:
   receiving surveillance area set up information including camera height, camera direction, end field height and obstruction location information.

9. The method of claim 8, wherein operating a computer system to generate a surveillance layout plan further includes:
   computing at least some camera positioning information and camera field of view information including at least one of a camera tilt angle or a camera orientation angle.

10. The method of claim 9, wherein said at least some camera positioning information is generated based on user input entered onto a displayed map.

11. The method of claim 1, further comprising operating the computer system to:
   generate a purchase order or quotation list listing at least some of the cameras indicated in said surveillance layout plan; and
   output said surveillance layout plan to another device.

12. The method of claim 11, wherein said purchase order or quotation includes at least some additional components which are not visually displayed on said surveillance layout plan but which are necessary to implement a system corresponding to said surveillance layout plan.

13. The method of claim 12, wherein said additional components include at least one of: a router, camera mount kit, central controller module, a monitor station, an alarm station or a combined monitoring/alarm station.

14. The method of claim 1, wherein said first finite camera coverage area indicator indicates an end of the coverage area via a third line used to connect first and second lines extending out from the position of said first camera at a non-zero angle from each other.

15. The method of claim 14, wherein said surveillance layout plan further includes a first blind zone indicator indicating a blind zone corresponding to the first camera which is not covered by said first camera.

16. The method of claim 15, wherein said blind zone indicator is triangular in shape.

17. The method of claim 15, wherein said surveillance layout plan further includes text information corresponding to said first camera, said text information indicating a mounting height of the first camera and a first camera mount angle.

18. The method of claim 17, wherein said text information corresponding to said first camera further indicates a far end distance of the area which is monitored by said first camera and a close end distance of the area monitored by said first camera.

19. The method of claim 15, wherein said surveillance layout plan further indicates the position of buildings in said area subject to surveillance.

20. The method of claim 15, wherein said surveillance layout plan further includes:
a second camera position indicator indicating a second camera position;
a second finite camera coverage area indicator indicating a second finite camera coverage area corresponding to a second camera whose position is indicated by said second camera position indicator;
a third camera position indicator indicating a third camera position;
a third finite camera coverage area indicator indicating a third finite camera coverage area corresponding to a third camera whose position is indicated by said third camera position indicator.

21. The method of claim 20, wherein said surveillance layout plan further includes:
a second blind zone indicator indicating a blind zone corresponding to the second camera; and
a third blind zone indicator indicating a blind zone corresponding to the third camera.

22. The method of claim 1, wherein said first finite camera coverage area indicator and a first triangular blind zone indicator, indicating a blind zone corresponding to said first camera, in combination cover a triangular area having a point terminating at a location indicated by said first camera position indicator.

23. An apparatus capable of providing surveillance system planning information, the apparatus comprising:
a layout plan generation module for generating a surveillance layout plan showing an area subject to surveillance, said layout plan including a first camera position indicator indicating a first camera position and a first finite camera coverage area indicator indicating a first finite coverage area corresponding to a first camera whose position is indicated by said first camera position indicator; and
an output module for outputting said layout plan to one of a communications network, a printer and a display device.

24. The apparatus of claim 23, further comprising a display device coupled to said output module for displaying said layout plan.

25. The apparatus of claim 23, further comprising:
an overlay module for overlaying said camera position indicator and said first finite camera coverage area indicator on a map.

26. The apparatus of claim 25, further comprising:
a download module for downloading said map from a map providing server,
wherein said map providing server is coupled to the Internet,
wherein said download module is configured to perform downloading via the Internet, and
wherein said map providing server provides said map based on a satellite image.

27. The apparatus of claim 25, wherein said apparatus further includes a memory including:
a purchase order or quotation list listing at least some of the cameras indicated in said surveillance layout plan generated by said layout plan generation module.

28. The apparatus of claim 27, wherein said purchase order or quotation stored in said memory includes at least some additional components which are not visually displayed on said map but which are necessary to implement a system corresponding to said surveillance layout plan.

29. The apparatus of claim 28, wherein said additional components include at least one of: a router, camera mount kit, central controller module, a monitor station, an alarm station or a combined monitoring/alarm station.

30. The apparatus of claim 23, wherein said surveillance layout plan further includes a first blind zone indicator indicating a blind zone corresponding to the first camera which is not covered by said first camera.

31. The apparatus of 30, wherein said surveillance layout plan further includes:
a second camera position indicator indicating a second camera position;
a second finite camera coverage area indicator indicating a second coverage area corresponding to a second camera whose position is indicated by said second camera position indicator;
a third camera position indicator indicating a third camera position; and
a third finite camera coverage area indicator indicating a third coverage area corresponding to a third camera whose position is indicated by said third camera position indicator.

32. The apparatus of claim 31, further comprising:
memory including: at least a portion of a software based surveillance system planning tool which was downloaded from the Internet and an Internet browser module used to trigger executing of at least some computer instructions included in said portion of said software based surveillance system planning tool; and
wherein said layout plan generation module is part of said software based surveillance system planning tool.

33. The apparatus of claim 32,
wherein said memory further includes stored camera type selection information and received camera configuration information that were received from a user of said apparatus.

34. The apparatus of claim 33, wherein said surveillance layout plan further includes:
a second blind zone indicator indicating a blind zone corresponding to the second camera; and
a third blind zone indicator indicating a blind zone corresponding to the third camera.

35. The apparatus of claim 34, wherein the camera configuration information includes sensor resolution.

36. The apparatus of claim 34, wherein said memory further includes:
  received surveillance area set up information.

37. The apparatus of claim 36, wherein the surveillance area set up information includes:
  camera height and end field height information.

38. The apparatus of claim 23, wherein said apparatus further includes a memory including:
  at least some camera positioning information and camera field of view information computed by said layout plan generation module.

39. The apparatus of claim 38, wherein said at least some camera positioning information includes at least one of a camera tilt angle, camera orientation angle, and a geographic camera location.

40. The apparatus of claim 39, wherein said at least some camera positioning information is generated based on user input entered onto a displayed map.

41. The apparatus of claim 23, wherein said layout plan generation module is an automated layout plan generation module which generates said layout plan automatically using at least some coverage region information.

42. The apparatus of claim 41, wherein said layout plan generation module also uses coverage type information, said coverage type information indicating perimeter type surveillance coverage or area type surveillance coverage.

43. The apparatus of claim 41, wherein said layout plan generation module also uses site characteristic information including a digging constraint.

44. The apparatus of claim 41, wherein said layout generation module includes logic for selecting at least one of camera location or camera type.

45. The apparatus of claim 23, further comprising:
  an information collection and reporting module for collecting plan layout information and reporting said information to a remote central location.

46. The apparatus of claim 23, wherein said first finite camera coverage area indicator and a first triangular blind zone indicator, indicating a blind zone corresponding to said first camera, in combination cover a triangular area having a point terminating at a location indicated by said first camera position indicator.

* * * * *